US012659209B2

(12) United States Patent
Moradi et al.

(10) Patent No.: US 12,659,209 B2
(45) Date of Patent: Jun. 16, 2026

(54) SYSTEMS, DEVICES, AND METHODS FOR MULTI-BAND SPREAD SPECTRUM COMMUNICATION

(71) Applicant: Battelle Energy Alliance, LLC, Idaho Falls, ID (US)

(72) Inventors: Hussein Moradi, Idaho Falls, ID (US); Thomas C. Sego, Idaho Falls, ID (US); Behrouz Farhang, Salt Lake City, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 320 days.

(21) Appl. No.: 18/168,808

(22) Filed: Feb. 14, 2023

(65) Prior Publication Data

US 2023/0261922 A1     Aug. 17, 2023

Related U.S. Application Data

(60) Provisional application No. 63/268,030, filed on Feb. 15, 2022.

(51) Int. Cl.
| | |
|---|---|
| *H04B 1/00* | (2006.01) |
| *H04B 1/69* | (2011.01) |
| *H04L 27/26* | (2006.01) |

(52) U.S. Cl.
CPC ......... *H04L 27/26416* (2021.01); *H04B 1/69* (2013.01)

(58) Field of Classification Search
CPC ............................ H04L 27/26416; H04B 1/69

USPC ................................ 375/130, 219, 295, 316
See application file for complete search history.

(56) References Cited

U.S. PATENT DOCUMENTS

| | | | |
|---|---|---|---|
| 7,301,993 | B2 | 11/2007 | Ibrahim et al. |
| 7,317,753 | B2 | 1/2008 | Yang |
| 9,215,587 | B2 | 12/2015 | Moradi et al. |
| 9,559,748 | B2 | 1/2017 | Moradi et al. |
| 9,980,240 | B2 | 5/2018 | Hong et al. |
| 10,420,132 | B2 | 9/2019 | Moradi et al. |
| 10,491,261 | B1 | 11/2019 | Al-Eidan |
| 2008/0260003 | A1 | 10/2008 | Baudais |

(Continued)

OTHER PUBLICATIONS

Crussiere et al., "Robust and High-Bit Rate Communications Over PLC Channels: a Bit-Loading Multi-Carrier Spread-Spectrum Solution", International Symposium on Power Line Communications and Its Applications, 2005, 5 pages.

(Continued)

*Primary Examiner* — Zewdu A Kassa
(74) *Attorney, Agent, or Firm* — TraskBritt

(57) ABSTRACT

Systems, devices, and methods are described for multi-band spread spectrum communication. A communication system, which may include any number of communication nodes, may include a first communication node including a dedicated first number of subcarrier bands, and a second communication node including a dedicated second number of subcarrier bands. The first communication node may be configured to transmit a link request to the second communication node over the first number of subcarrier bands, and the second communication node may be configured to transmit another link request to the first communication node over the second number of subcarrier bands.

20 Claims, 13 Drawing Sheets

(56) References Cited

U.S. PATENT DOCUMENTS

| | | | | |
|---|---|---|---|---|
| 2016/0191114 A1* | 6/2016 | Moradi | ................. | H04L 9/0816 |
| | | | | 375/148 |
| 2020/0091960 A1* | 3/2020 | Moradi | ................ | H04B 1/7093 |
| 2020/0205230 A1* | 6/2020 | Haustein | .............. | H04B 7/0617 |
| 2021/0212030 A1* | 7/2021 | Selvanesan | ........... | H04W 72/04 |

OTHER PUBLICATIONS

Haab et al., "Filter Bank Multi-Carrier Spread Spectrum with Biorthogonal Signaling for High Speed Data Transmission Through HF Skywave Channels", IEEE Military Communications Conference (MILCOM), Waveforms and Signal Processing, 2018, Track 1, 6 pages.
Laraway et al., "Experimental Results of FB-MC-SS on a Wideband HF NVIS Propagation Channel", IEEE Military Communications Conference (Milcom), Waveforms and Signal Processing, 2016, Track 1, 6 pages.
Laraway et al., "HF Band Filter Bank Multi-Carrier Spread Spectrum", IEEE Military Communications Conference (Milcom), Waveforms and Signal Processing, 2015, Track 1, 9 pages.

* cited by examiner

SYSTEMS, DEVICES, AND METHODS FOR MULTI-BAND SPREAD SPECTRUM COMMUNICATION

CROSS-REFERENCE TO RELATED APPLICATION

This application claims the benefit under 35 U.S.C. § 119(e) of U.S. Provisional Patent Application Ser. No. 63/268,030, filed Feb. 15, 2022, the disclosure of which is hereby incorporated herein in its entirety by this reference.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

FIELD

Embodiments of the present disclosure relate generally to wireless transmission of signals and, more particularly, to multi-band spread spectrum communication. Yet more specifically, various embodiments relate to utilizing non-contiguous subcarrier bands in multi-band spread spectrum communication. Moreover, some embodiments relate to multi-band link establishment in multi-band spread spectrum communication. Further, some embodiments relate to packet formats for multi-band spread spectrum communication.

BACKGROUND

A spread-spectrum (SS) technique is often used to distribute wireless transmit signals over a wider bandwidth than the minimum required transmission bandwidth. In military applications, SS transmission may be used to avoid jamming and also to reduce the probability of detection or interception. In civilian applications, some forms of SS, known as code-division multiple access (CDMA), may be used to allow multiple users to share the same channel or spectrum. Common techniques being used are direct-sequence spread spectrum (DS-SS) and frequency-hopping spread spectrum (FH-SS). These common SS techniques may suffer from susceptibility to narrow and partial band interference. Multi-Carrier Spread Spectrum (MC-SS) is a particular form of SS that is designed to be resistant to narrow and/or partial band interference.

BRIEF SUMMARY

One or more embodiments of the present disclosure include a communication system. The communication system may include a first communication node including a dedicated first number of subcarrier bands. The communication system may further include a second communication node including a dedicated second number of subcarrier bands. The first communication node may be configured to transmit a link request to the second communication node over the second number of subcarrier bands, and the second communication node may be configured to transmit another link request to the first communication node over the first number of subcarrier bands.

According to one or more other embodiments, a communication system may include a number of communication nodes. Each communication node of the number of communication nodes includes a number of dedicated subcarrier bands that other communication nodes of the number of communications nodes use to send link request to the communication node.

Other embodiments include a communication device. The communication device may include a transceiver configured to transmit a filter bank multi-carrier spread spectrum (FBMC-SS) signal. The transceiver may include a pulse-shaping filter including a number of non-contiguous subcarrier bands.

One or more embodiments of the present disclosure include a method. The method may include transmitting, via a first communication device, a link request to a second communication device over a number of subcarrier bands assigned to the second communication device. The method may also include monitoring, via the first communication device, a different number of subcarrier bands assigned to the first communication device for another link request transmitted to the first communication device.

According to other embodiments, a method may include generating a filter bank multi-carrier spread spectrum (FBMC-SS) signal via a pulse-shaping filter including a number of non-contiguous subcarrier bands. The method may also include transmitting the FBMC-SS signal.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
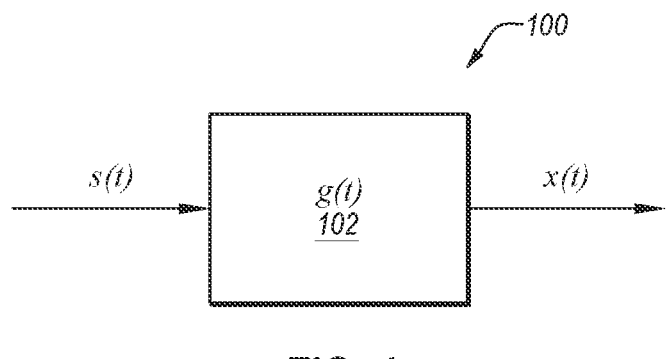
FIG. 1 is a simplified block diagram of an example filter bank multi-carrier spread spectrum transmitter including a pulse-shaping filter, in accordance with various embodiments of the disclosure.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

High frequency (HF) skywave propagation is a challenging environment for digital communications. In highly disturbed ionospheric conditions, a HF skywave propagation channel has large spreads in both time and frequency. Under these conditions, channel estimation and equalization are difficult. At the other extreme, in quiet HF conditions, a narrowband HF waveform may experience frequency flat fading with fade rates of several seconds. HF waveforms typically include interleaving and forward-error-correction (FEC) to overcome these fading scenarios, adding to the receiver a latency.

Another significant challenge in HF skywave communication is interference from other users. This interference exists because HF signals propagate long distances making frequency allocation difficult. Within the existing standards (e.g., MIL-STD-188-110D, Appendix D) a form of direct sequence spread spectrum (DS-SS) technique, using Walsh codes, has been used to combat narrowband interferers. Additionally, excision filters are often used to improve on the receiver performance. Although successful to some extent, the technique may not be resistive to several narrowband interferers that could be several tens of decibels above the signal of interest. An alternative approach that helps in rejecting narrowband interferers is the class of spread spectrum systems that make use of filter banks. These methods, which may be generically termed multi-carrier spread spectrum (MC-SS) systems, spread the information chips across the transmission band. Some research has suggested an OFDM-based structure to represent each chip by a particular tone. In OFDM, the prototype filter of the filter bank is a sinc pulse in the frequency domain, which is not very effective in rejecting narrowband interferers. Another implementation of MC-SS uses filter banks with more sophisticated prototype filters.

A bank of spectrally adjacent, but disjoint, filters may be used to carry the chips of a spread spectrum system. Spectrally disjoint filters allow combining different chips with weights that are proportional to the quality of respective chips. Chips with higher signal-to-noise ratio (SNR) are given higher weights. Accordingly, the chips (equivalently, the portions of the spectrum) that are subject to a high level of interference are effectively suppressed without any adverse effect on the remaining chips.

In the particular case of HF skywave signals, there is another practical issue that may affect the performance of a link between a transmitter and receiver. The information provided by an ionosonde ionogram specifies the range of frequencies that skywave signals will likely be reflected from the ionosphere, at a given location and at a given time. However, the quality (i.e., the strength) of the reflected waves at different parts of this spectral range is unknown. In practice, an automatic link establishment (ALE) mechanism is used to find portions of the spectrum (i.e., channels) that provide a sufficiently strong link between any two communicating stations. Such ALE procedures are slow and cumbersome, and thus may lead to an unacceptable performance in cases where a link has to be established with a minimum delay.

Various embodiments as described herein relate to establishing a link between a number of nodes of a communication system. Various embodiments of the disclosure relate to constructing and/or transmitting a filter bank multi-carrier spread spectrum (FBMC-SS) signal. Further, various embodiments relate to processing a received FBMC-SS signal.

Embodiments of the disclosure will now be explained with reference to the accompanying drawings.

FIG. 1 is a block diagram of a portion of an example filter bank multi-carrier spread spectrum (FBMC-SS) transmitter 100 including a pulse-shaping filter 102, in accordance with various embodiments of the disclosure. As will be appreciated, an FBMC-SS signal may be constructed via FBMC-SS transmitter 100. An input including a sequence of data symbols s[n] may be provided in a train of impulses as:

$$s(t) = \sum_n s[n]\delta(t - nT); \tag{1}$$

wherein T is a symbol interval.

Typically, data symbols s[n] is a sequence of binary coded bits originating from information bits b[n]. Alternatively, pairs of coded bits may be used to select data symbols s[n]

from a QPSK (quadrature phase shift keying) alphabet. Larger QAM or PSK alphabets may also be used, but this is less common in spread spectrum signaling, in general, as a goal may be to keep the signal power spectral density as low as possible.

In FIG. 1, g(t), which is pulse-shaping filter 102, may be defined as:

$$g(t) = \sum_{k=0}^{N-1} \gamma_k h_k(t); \tag{2}$$

wherein $h_k(t)$ are a set of passband filters centered at the subcarrier center frequencies $f_k$, for k=0 to N−1, and $\gamma_k$ are the spreading gains at the subcarrier bands. The passband filters all originate from the same prototype filter with the impulse response h(t). This implies that:

$$h_k(t) = h(t)e^{j2\pi f_k t} \text{ for } k=0,1,\ldots,N-1. \tag{3}$$

The prototype filter h(t) is a square-root Nyquist filter, and often, to allow a design with best suppression of out-of-band spectrum, is given a roll-off factor α=1. Moreover, the spreading gain factors $\gamma_k$ are a set of complex numbers with unit amplitude, i.e., $|\gamma_k|^2=1$, and phase angles that are uniformly distributed over the interval 0 to 2 π. These phase angles may be optimized to minimize the peak-to-average power ratio of the synthesized signal.

The synthesized signal at an output of FBMC-SS transmitter 100 may thus be expressed as:

$$x(t) = \sum_{k=0}^{N-1} \sum_n \gamma_k s[n] h_k(t - nT). \tag{4}$$

Figure 2:
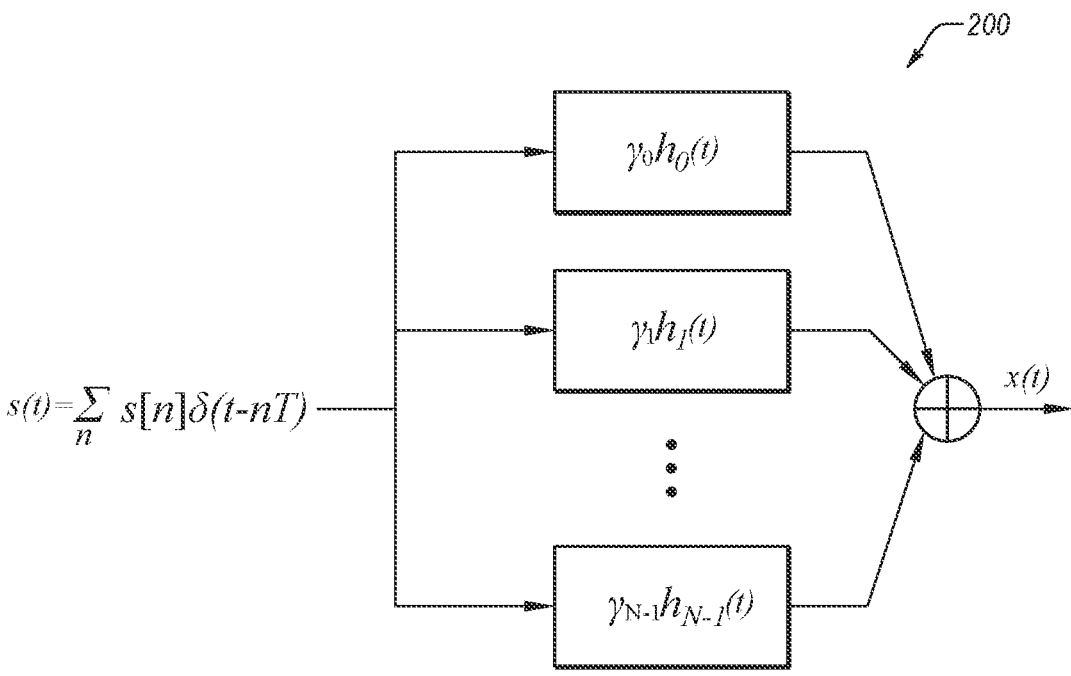
FIG. 2 is another block diagram of an example filter bank multi-carrier spread spectrum transmitter, according to various embodiments of the disclosure.

Following equation (4), an FBMC-SS transmitter 200, which may be a more detailed block diagram of FBMC-SS transmitter 100, is shown in FIG. 2.

Certain signal processing steps at both a transmitter and a receiver may be simplified via the assumption that for all choices of $f_k$, $f_k T$ is an integer. This, in turn, implies that, for all choices of the indices k and n:

$$e^{j2\pi f_k nT} = 1. \tag{5}$$

Thus, equation (4) may be rearranged as:

$$x(t) = \left(\sum_n s[n]h(t - nT)\right) \sum_{k=0}^{N-1} \gamma_k e^{j2\pi f_k t}. \tag{6}$$

Figure 3:
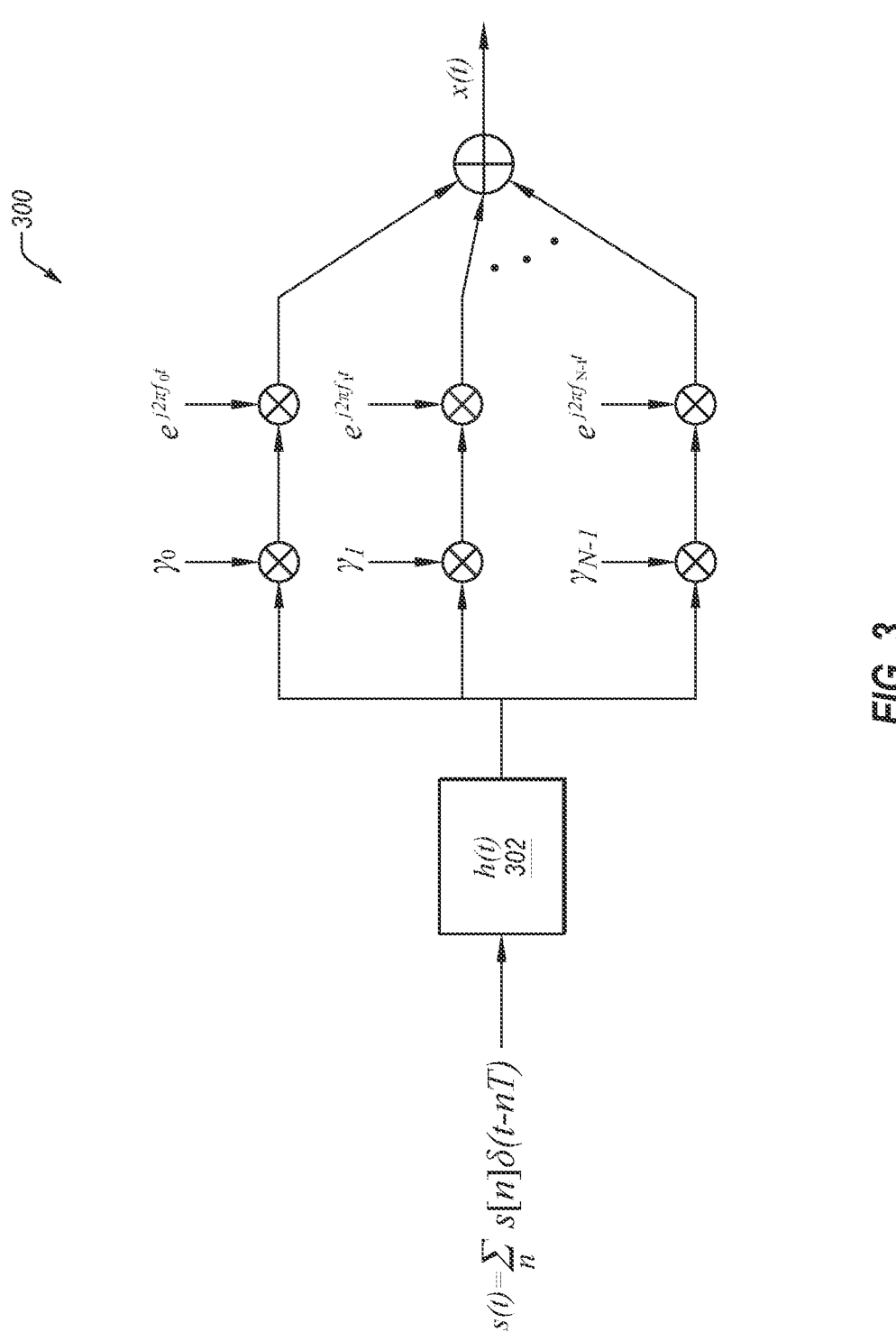
FIG. 3 is another block diagram of another example filter bank multi-carrier spread spectrum transmitter, according to various embodiments of the disclosure.

Furthermore, using equation (5), an FBMC-SS transmitter 300, which may be a more detailed block diagram of FBMC-SS transmitter 200, is shown in FIG. 3.

Figures 4, 5:
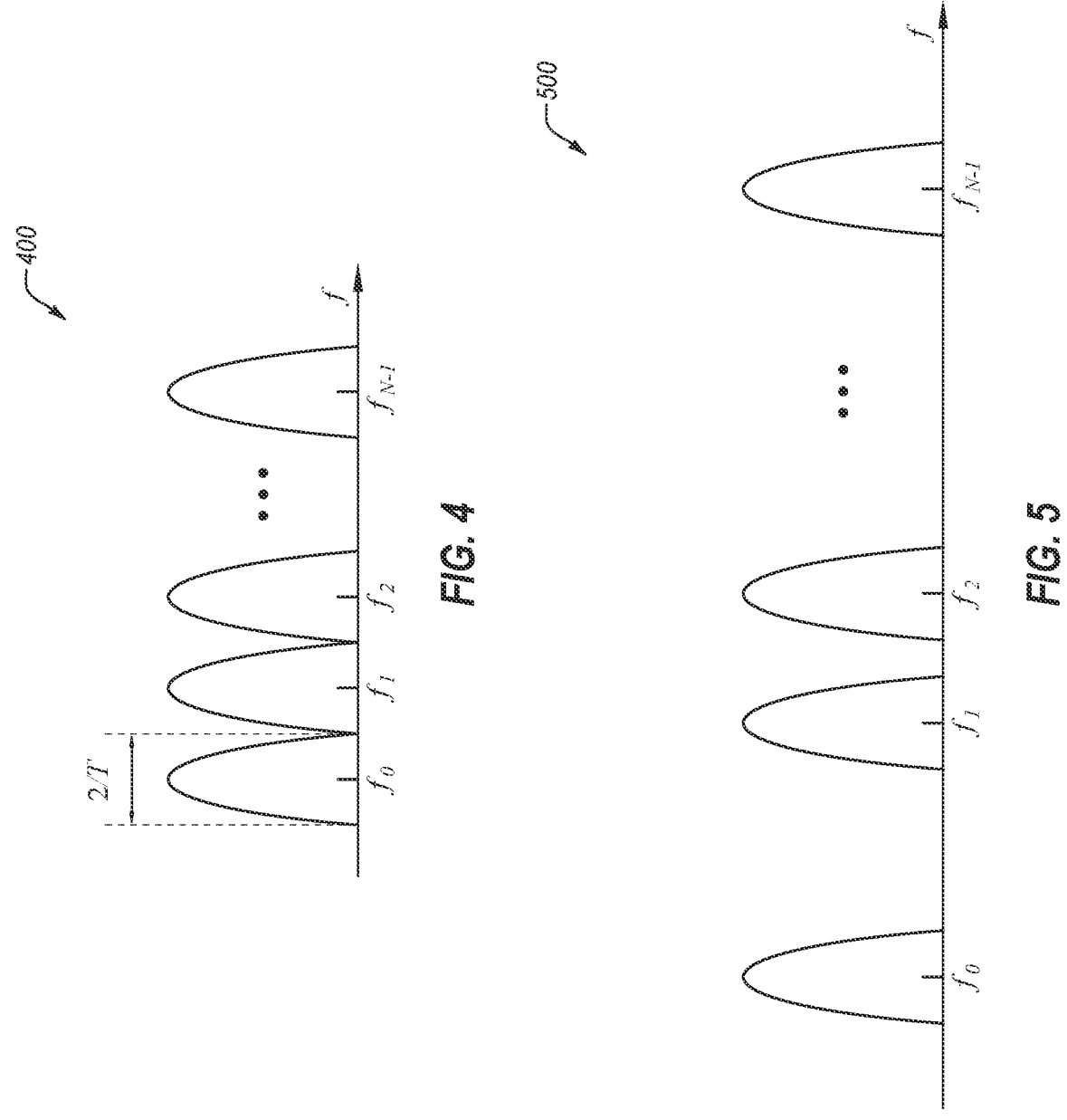
FIG. 4 depicts an example frequency response of a contiguous pulse-shaping filter.
FIG. 5 depicts an example frequency response of a non-contiguous pulse-shaping filter, according to various embodiments of the disclosure.

According to various embodiments of the disclosure, FBMC-SS signal construction may be modified. In these embodiments, the center frequencies $f_k$ of the subcarrier bands are allowed to spread over a relatively wide band (e.g., over a spectrum which is an order of magnitude wider than conventional systems and methods). FIG. 4 depicts an example frequency response 400 of a conventional contiguous pulse-shaping filter. In contrast, FIG. 5 depicts an example frequency response 500 of a non-contiguous pulse-shaping filter, according to various embodiments of the disclosure. Note that while the spacing of the center frequencies $f_k$ in FIG. 4 is fixed, the spacing of the center frequencies $f_k$ in FIG. 5 is arbitrary and (generally) wider. In this embodiment, subcarrier bands may be spread over a very large bandwidth with empty spaces between them. As discussed more fully below, such a change in g(t) brings a number of advantages in designing more effective high frequency (HF) transceivers.

Figure 6:
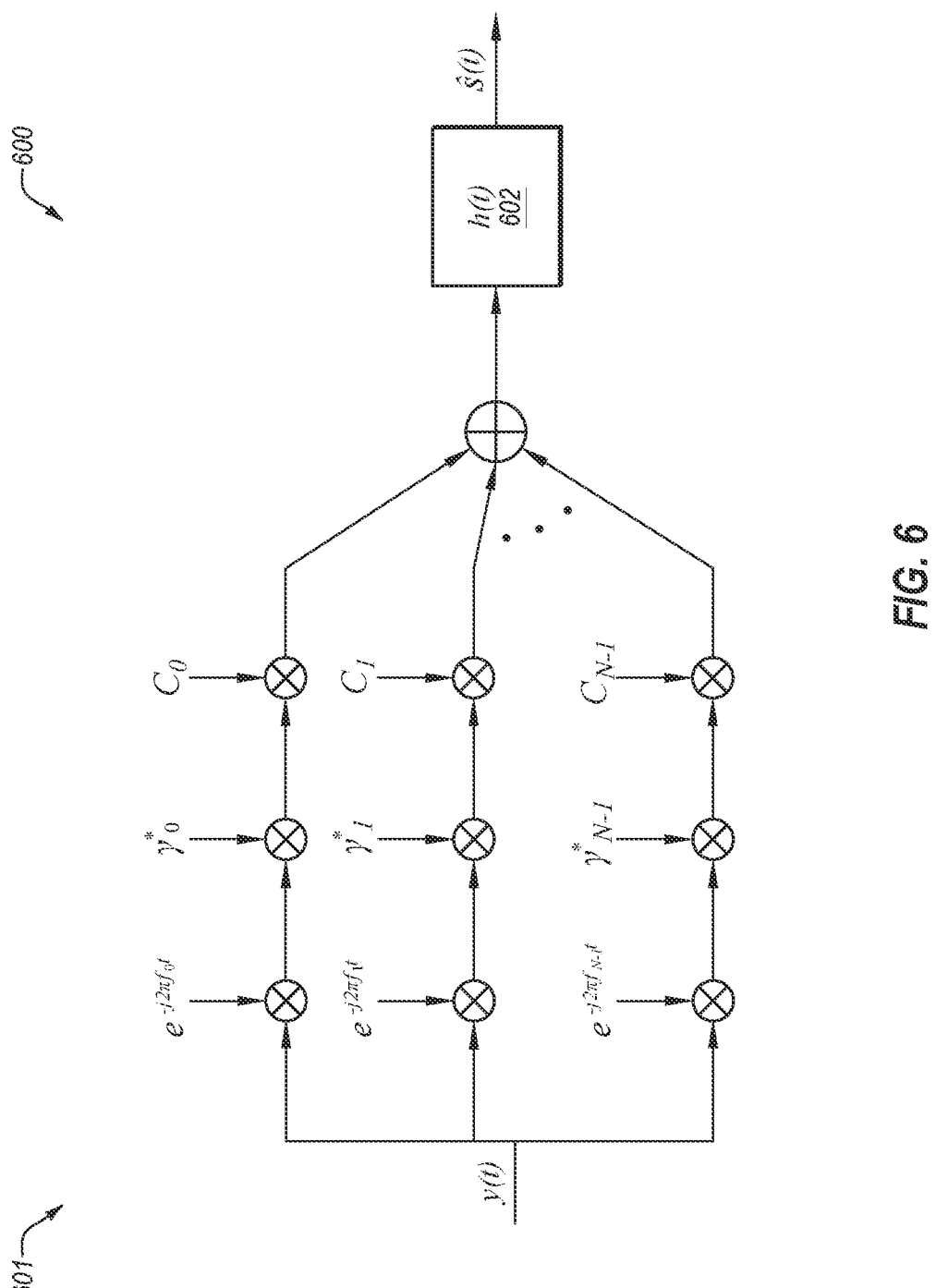
FIG. 6 is a block diagram of an example filter bank multi-carrier spread spectrum receiver, in accordance with various embodiments of the disclosure.

FIG. 6 is a block diagram of an example filter bank multi-carrier spread spectrum receiver, in accordance with various embodiments of the disclosure. FBMC-SS receiver 600, which may be matched to FBMC-SS transmitter 300 shown in FIG. 3, includes a bank of demodulators 601 configured to convert signals from different subcarrier bands down to baseband. Subsequently, the spreading gains $\gamma_k$ may be removed (through multiplications with their conjugates, recalling that $$\gamma_k \gamma_k^* = 1)$$

and the results may be combined using a set of maximum-ratio-combining (MRC) coefficients $c_k$. The combined results may then be filtered through receiver filter 602, which may be matched to a filter 302 of FIG. 3. Assuming that the impulse response h(t) is a real-value and an even symmetric function of time, a receiver filter 602 may also be characterized by the same impulse response h(t).

According to some embodiments, combiner coefficients $c_k$ may be selected to remove the phase rotation introduced by the channel at each subcarrier band and also to give higher weights to those subcarriers that have a higher SNR.

It should be noted that, in practice, both transmitter and receiver signal processing steps (particularly, at baseband) may be performed in discrete-time. Here, for the simplicity of presentation, a continuous-time formulation is adopted. However, persons having ordinary skill in the art will appreciate that conversion to discrete-time is within the scope of the disclosure.

With reference to FBMC-SS receiver 600, it may be assumed that the channel impulse spans over an interval that is negligible compared to the symbol interval T. Under this condition, the channel response across each subcarrier band may be approximated by a flat gain, hence, it can be also compensated by a single tap equalizer. Therefore, the MRC coefficients $c_k$ in FIG. 6 may be also interpreted as a set of equalizer gains.

In the particular case of HF channels, the channel impulse response may consist of multi-modes, with each mode originating from a cluster of reflections from one of the layers of ionosphere, or, from multiple bounces between the ionosphere and the earth's surface. The time spreading of each mode is typically significantly less than T, but spacing between different modes may be comparable or greater than T. Under this condition, a RAKE receiver (i.e., with each branch of the RAKE associated with one of the modes) may be adopted. Contrast to conventional systems wherein subcarrier bands are adjacent to one another, according to various embodiments, subcarrier bands may be non-contiguous.

According to some embodiments, matched filtering may be performed wherein the signal energy at different subcarrier bands are normalized to a fixed value before being added together. These embodiments, which are applicable to cases wherein subcarrier bands are non-contiguous, may provide rejection of strong interferers when the strong interferers appear over a subset of the subcarrier bands.

With reference again to FIG. 3, the pulse-shaping filter at transmitter 300 has the form:

$$g(t) = \left(\sum_k \gamma_k e^{j2\pi f_k t}\right)h(t). \tag{7}$$

Accordingly, the normalized matched filter may have the following form:

$$g_{NMF}(t) = \left(\left(\sum_k \frac{\gamma_k}{P_k} e^{-j2\pi f_k t}\right)h(-t)\right)^* = \left(\sum_k \frac{\gamma_k^*}{P_k} e^{j2\pi f_k t}\right)h(t); \tag{8}$$

wherein $P_k$ is the signal power at kth subcarrier band.

The combined impulse response of the transmitter pulse-shaping filter, g(t), and the normalized match filter, $g_{NMF}$(t), at FBMC-SS receiver 600 is:

$$\eta(t) = \tag{9}$$

$$g(t)\star g_{NMF}(t) = \int_{-\infty}^{\infty}\left(\sum_k \gamma_k e^{j2\pi f_k \tau}\right)h(\tau)\left(\sum_k \frac{\gamma_k^*}{P_k} e^{j2\pi f_k(t-\tau)}\right)h(t-\tau)d\tau.$$

It is noted that the subcarrier bands are non-overlapping and $|\gamma_k|^2 = 1$, and equation (9) may reduce to:

$$\eta(t) = q(t)p(t); \tag{10}$$

wherein $$q(t) = \sum_k \frac{1}{P_k} e^{j2\pi f_k t}; \tag{11}$$

and $$p(t) = h(t)\star h(t) \tag{12}$$

is the Nyquist pulse designed for symbol spacing T.

With $f_k$T being an integer (i.e., based on the prior assumption), the exponential terms under summation on the right-hand side of equation (11) may be phase-aligned at an integer multiple of T, hence adding up to a relatively large amplitude. At mid-points, between the integer multiples T also these exponential terms may add up to a large amplitude. Since for values oft out of the range (−T to T), p(t) vanishes to (close to) zero, only values of q(t) in this range are of interest here.

Figure 7:
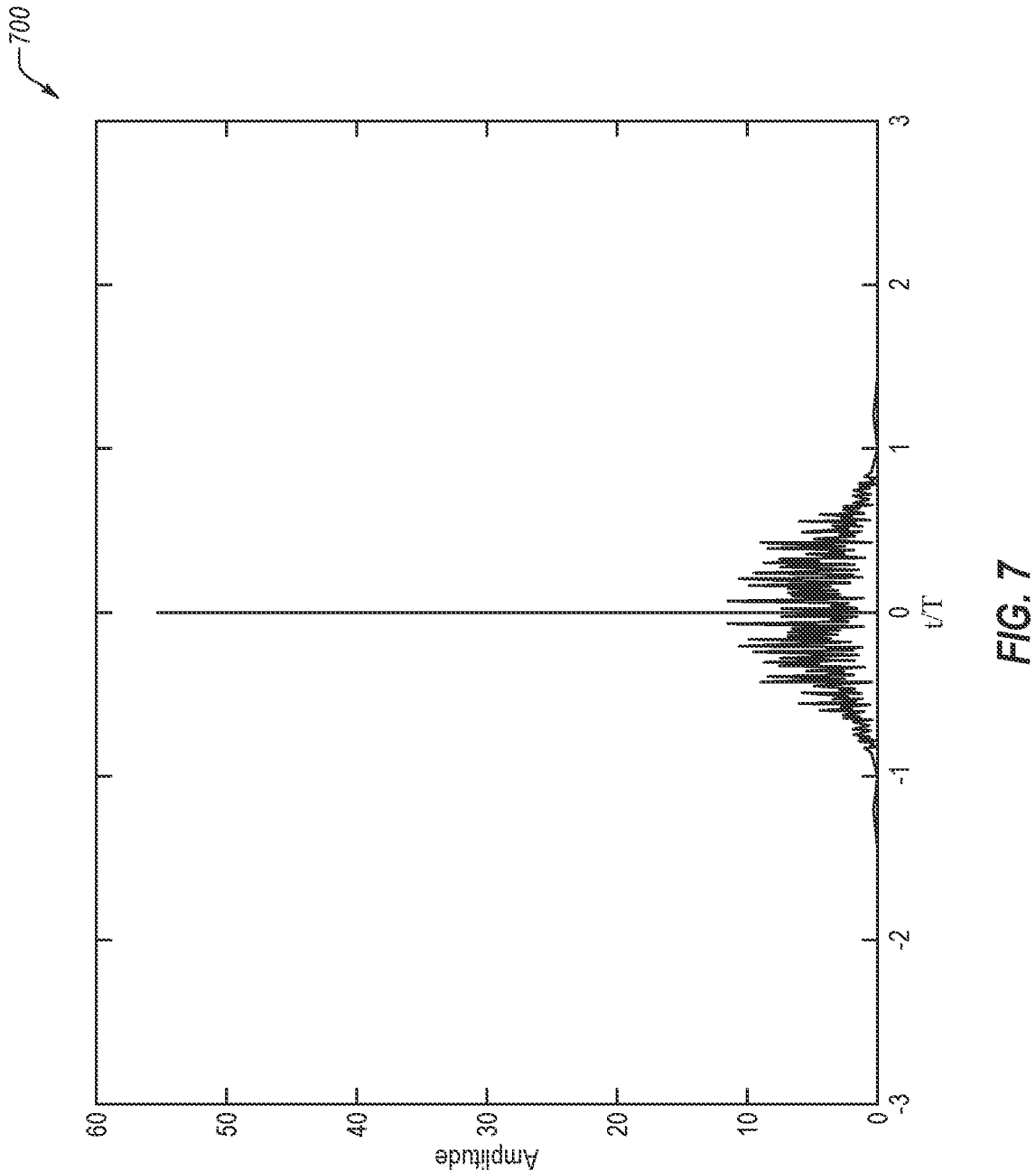
FIG. 7 is a plot depicting a combined impulse response of a pulse-shaping filter at a transmitter and a normalized matched filter at a receiver, according to various embodiments of the disclosure.

FIG. 7 is a plot 700 of the magnitude of the impulse response $\eta$(t)=g(t)*$g_{NMF}$(t), wherein $f_k$T are a set of 100 random integers in the range of 0 to 1000. Here, the power/energy normalization coefficients 1/$P_k$ were selected randomly from a uniform distribution over the interval 0 to 1.

In contrast to conventional systems that may provide impulse responses with three strong pulses (i.e., one at the center and two at the position ±T/2 away from the center), in FIG. 7, a unique strong sample is provided at the center of plot 700. The presence of the latter pulses in conventional systems is an outcome of positioning the center of subcarrier bands at regular spacing 2/T; see FIG. 4. In contrast, according to various embodiments (e.g., see FIG. 5 as the counterpart of FIG. 4), the subcarrier spacings are random. As will be appreciated in view of the following discussion, the absence of the pulses at the position ±T/2 away from the center may simplify the channel estimation and, thus, the receiver implementation. Details related to the presence of pulses at ±T/2 away from the center may be found in D. L. Wasden, H. Moradi, and B. Farhang-Boroujeny, "Design and Implementation of an Underlay Control Channel for Cognitive Radios," IEEE Journal on Selected Areas in Communications, vol. 30, no. 10, October 2012, pp. 1875-1889, the disclosure of which is hereby incorporated by reference in its entirety.

It is noted that there are certain positions of subcarrier center frequencies which can lead to a number of undesirable pulses in η(t) at positions t≠0. For instance, when the subcarriers are equally spaced, say, at spacing L/T, a number of strong pulses may appear at the regular intervals T/L. Such selections of subcarrier positions may be avoided, as it can introduce uncertainty in timing acquisition and carrier recovery at the receiver. Fortunately, in typical scenarios of interest of non-contiguous subcarriers, there may be large number of random choices of subcarrier positions that keep the η(t) relatively small for all values of t≠0. Variety of methods may be adopted for these choices. For instances, the results of a large number of randomized choices may be examined for certain properties and those with some desirable features may be selected.

Various embodiments of the disclosure include a packet format for data transmission and corresponding detection. In some embodiments, information may be transmitted in packets of finite length. Further, each packet may include (e.g., start with) a preamble that carries some known symbols (referred to as pilots). The preamble may be designed to allow effective detection of an incoming packet, detection of signal level for controlling the gain of an automatic gain control (AGC), detection and correction of any carrier frequency offset, and channel estimation for adjustment of detector/equalizer parameters at the receiver.

According to some embodiments, a preamble may include two or more cycles of a symbol sequence featuring favorable correlation properties, such as Zadoff-Chu sequences. In these embodiments, passing a received signal through a matched filter that is made of the cascade of $g_{NMF}(t)$ and the matched (time reversed and conjugated) version of the symbol sequence, strong pulses that can be easily recognized may be detected. These pulses allow reliable detection of an incoming packet, means to adjust timing, detection of any carrier frequency offset, and to proceed with initializing the receiver parameters for data recovery.

Figures 8, 9:
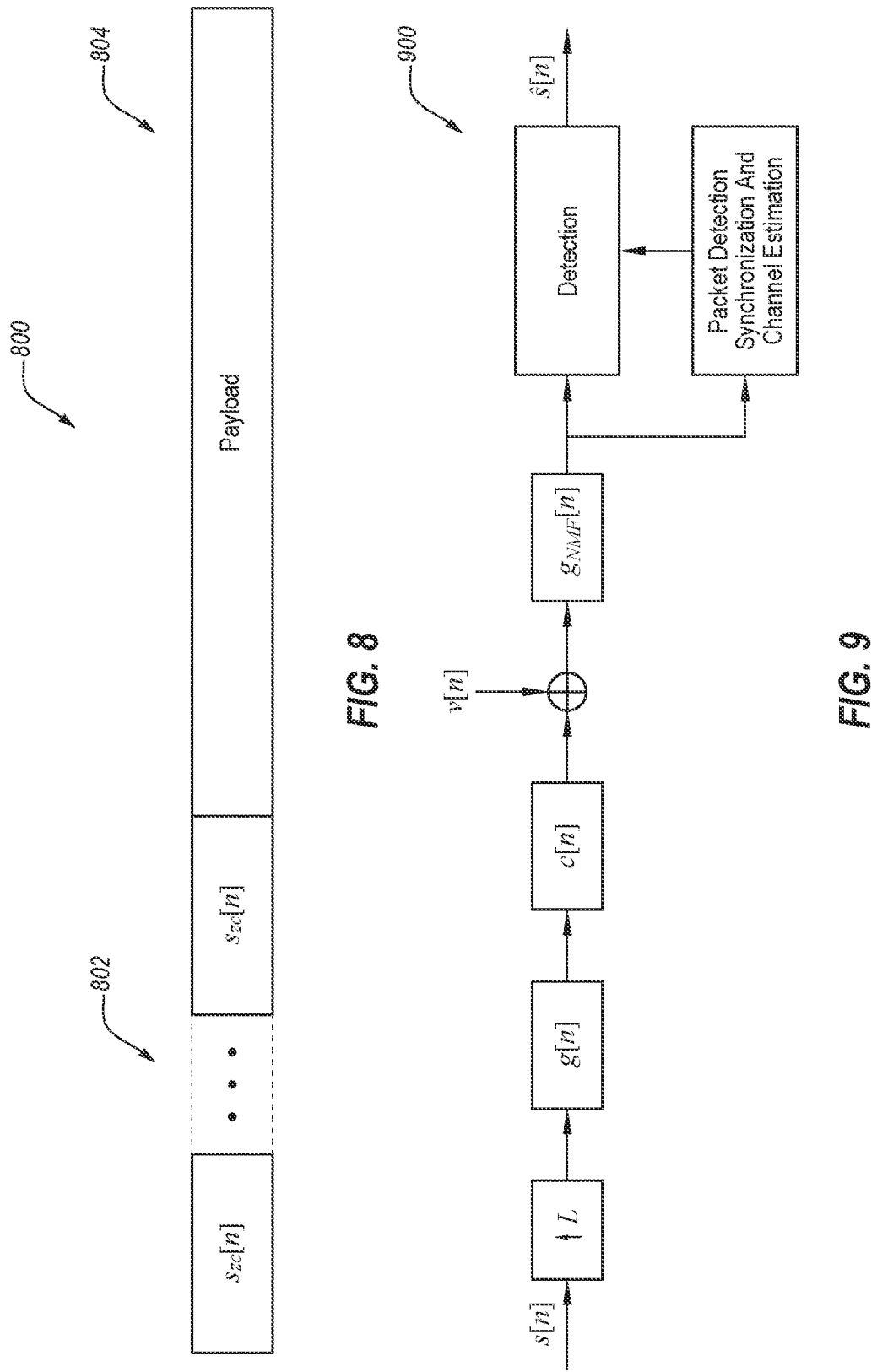
FIG. 8 depicts an example packet format, in accordance with various embodiments of the disclosure.
FIG. 9 is a block diagram of an example transmitter, channel, and receiver, according to various embodiments of the disclosure.

FIG. 8 depicts an example packet format 800, according to various embodiments of the disclosure. Packet format 800 includes a preamble 802 that consists of a number of periods of a symbol sequence featuring favorable correlation properties, such as a Zadoff-Chu sequence, $s_{zc}[n]$. Packet format 800 also includes a payload 804, which may include some interleaved pilot symbols that may be needed for tracking the channel variations.

FIG. 9 is a block diagram of a transceiver 900, according to various embodiments of the disclosure. With reference to FIG. 9, a number of steps that packet symbols may go through from a transmitter input to a receiver output will now be described. In this example, a discrete-time model may be used to allow straightforward formulation of signal processing steps described below. Transmit symbols s[n] may be up-sampled L fold to convert to a rate above the Nyquist rate of the synthesized signal at the transmitter output and then modulated to the respective radio transmission frequency. The pulse-shaping filter at the transmitter and the normalized matched filter at the receiver are also presented by discrete-time versions, g[n] and $g_{NMF}[n]$, respectively. Modulation and demodulation steps are excluded and the channel has been replaced by its equivalent baseband response. Such baseband response may be represented by the impulse response c[n] that may span over a range of $0 \leq n \leq L_c - 1$.

Figure 10:
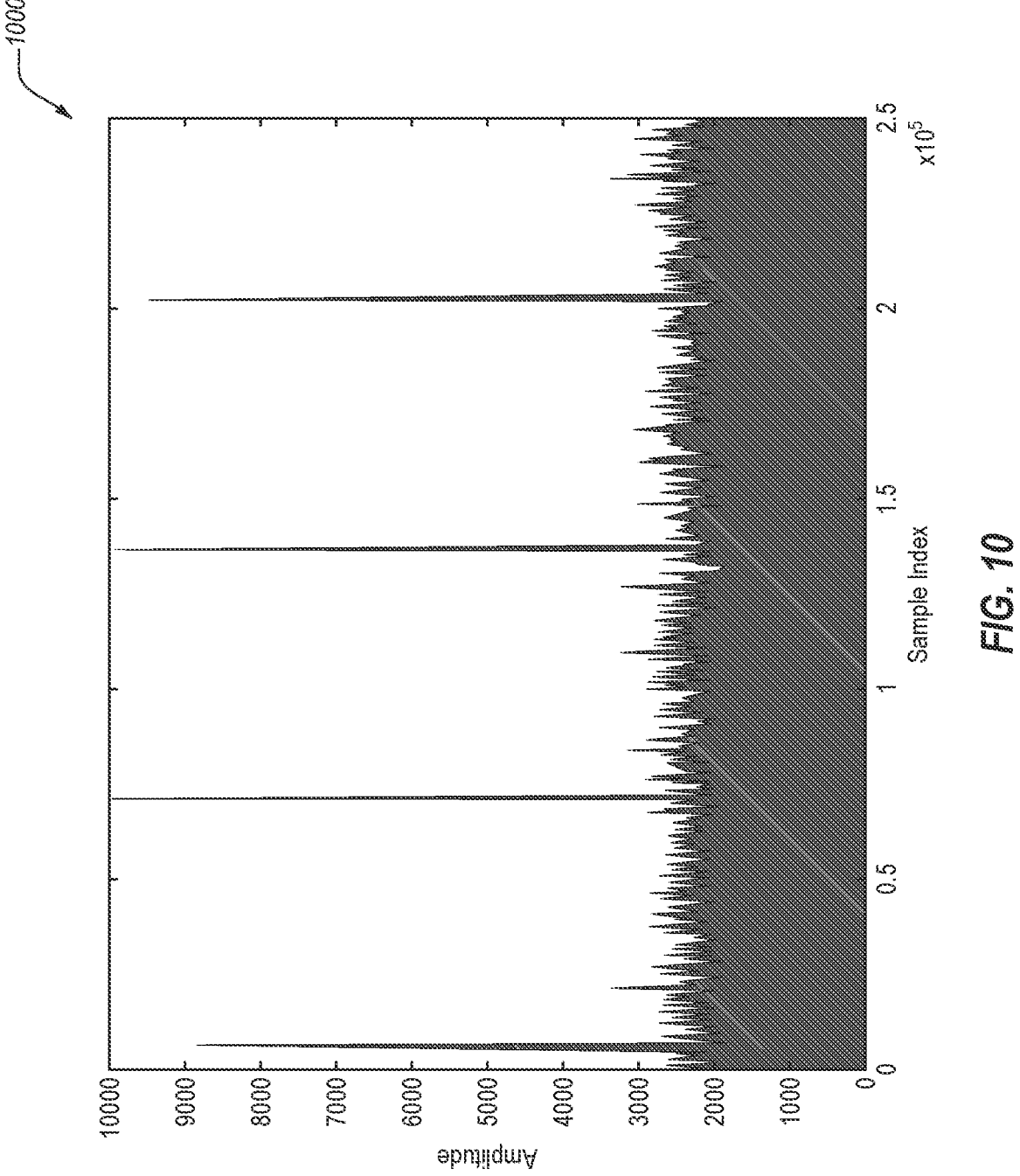
FIG. 10 is a plot depicting an amplitude of a received signal, in accordance with various embodiments of the disclosure.
Figure 11:
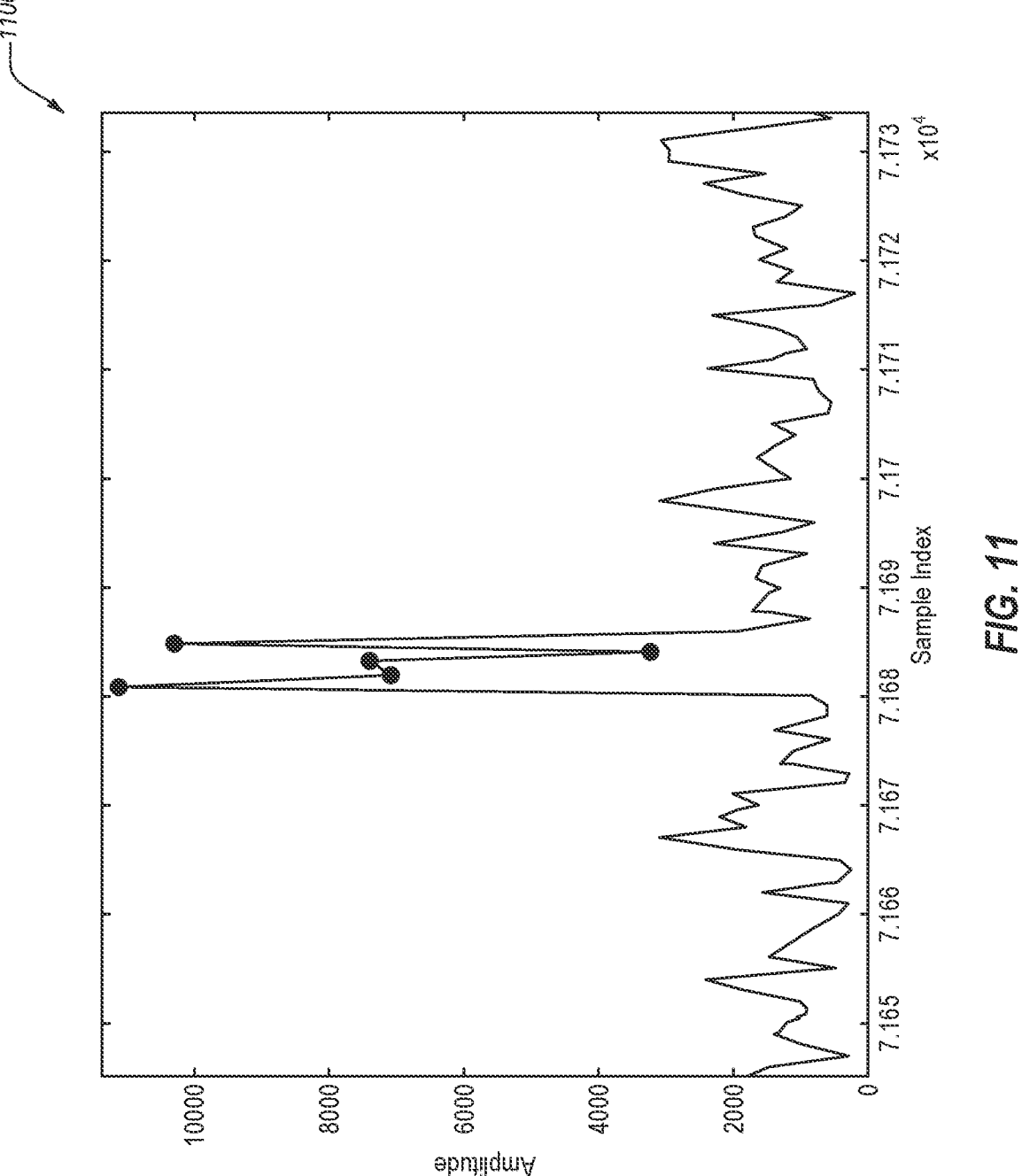
FIG. 11 is a zoomed-in version of one pulse of FIG. 10, showing the delay spread of the received signal caused by a multi-path channel.

Packet detection, synchronization, and channel estimation make use of the periodic property of the preamble. Accordingly, the output of the normalized matched filter $g_{NMF}[n]$ is passed through the matched and L-fold up-sampled version of $s_{zc}[n]$, and additional processing gain may be provided by the Zadoff-Chu sequence, hence, packets may be detected in very low SNR situations as well. This process also takes advantage of a unique property of the Zadoff-Chu sequences in that any Zadoff-Chu sequence and its cyclically shifted versions are orthogonal with one another. This unique property may be instrumental to synchronization and channel estimation steps that are described below. Further, a consequence of this unique property is that when the periodic preamble is passed through the cascade of $g_{NMF}[n]$ and the matched version of $s_{zc}[n]$, one occurrence of the signal K ($g[n]*c[n]*g_{NMF}[n]$), where K is a constant that relates to the energy of the Zadoff-Chu sequence, may appear during each cycle of the preamble. As shown in FIGS. 10 and 11, the occurrence may appear as a pulse at a position that may be used to synchronize a receiver with the incoming signal. Furthermore, the presence of any frequency offset introduces a phase-shift (rotation) as one move from one pulse to the next one. Mathematical equations and the relevant synchronization steps are provided below.

Since the transmitted preamble is periodic, the received signal, after completing a transient interval, is also periodic with the same period. One period of the received signal may be expressed as:

$$r[n] = s_{zc}^e[n] \circledast g[n] \circledast c[n] + v[n];$$ (13)

wherein v[n] is channel noise, $\circledast$ denotes circular convolution, $$s_{zc}^e[n]$$

is the L fold expanded version of $s_{zc}[n]$, and, here, g[n] and c[n] are expanded (by appending zeros to them) to a length equal to the length of $$s_{zc}^e[n].$$

After passing the received signal through the normalized matched filter $g_{NMF}[n]$ and the matched version of $$s_{zc}^e[n],$$

denoted as $$s_{zc,MF}^e[n],$$

a period of the result may be expressed as:

$$r'[n] = s_{zc}^{e}[n] \circledast g[n] \circledast c[n] \circledast g_{NMF}[n] \circledast s_{zc,MF}^{e}[n] + v'[n]; \tag{14}$$

wherein $$v'[n] = v[n] \circledast g_{NMF}[n] \circledast s_{zc,MF}^{e}[n]. \tag{15}$$

FIG. 10 is an example plot 1000 of amplitude of r'[n] wherein the constructed FBMC-SS signal includes 100 subcarrier bands spread randomly over a bandwidth, which is 1000 times wider than each of the subcarrier bands and SNR over the active subcarrier bands is −20 dB. In this example, the preamble consists of four periods of the Zadoff-Chu sequence. As seen in FIG. 10, even for a low SNR, the processing gain through combination of the normalized matched filter and matched filtering with the Zadoff-Chu sequence combines all the signal components into a set of narrow pulses that appear one per each period of Zadoff-Chu sequence. The position of these narrow pulses relates to the beginning of each period of the Zadoff-Chu sequence (i.e., the preamble), hence the pulse positions can be used for the receiver synchronization with the incoming signal. Moreover, as explained more fully below, the position of the narrow pulses may be used to detect the time location of the channel impulse response within the signal r'[n] and accordingly develop a method for accurately estimating the channel impulse response.

FIG. 11 is a plot 1100 depicting a peak shown in FIG. 10. As shown in FIG. 11, here, a multipath channel has five distinct paths that are adjacent to each other and are mostly well above the background noise. The beginning of these pulses may provide information about the position of the first path of the multipath channel (i.e., the timing information). Once the timing information is available, the following procedure may be used to obtain an accurate estimate of the channel impulse response.

To estimate the channel impulse response, initially, a single period of r'[n], starting from where the channel impulse response begins, is selected. Further, multiple periods of r'[n] may be selected and averaged to reduce the channel noise. Moreover, the single period or the average of multiple periods may be identified as q[n], which is of length $L_q = L_{zc}L$, wherein $L_{zc}$ is the length of the underlying Zadoff-Chu sequence, and L is the oversampling factor included in FIG. 9. For $0 \le n \le L_q - 1$:

$$q[n] = s_{zc}^{e}[n] \circledast g_0[n] \circledast c[n] \circledast g_{NMF,0}[n] \circledast s_{zc,MF}^{e}[n] + v''[n] \tag{16}$$

wherein v" [n] is the relevant noise sequence and the addition of the subscript '0' to go [n] and $g_{NMF,0}[n]$ indicates that g[n] and $g_{NMF}[n]$ (both of length $L_q$) have been circularly shifted to become zero-phase (i.e., the middle sample of both have been shifted to the index position n=0).

Furthermore, a DFT may be applied to both sides of equation (16) to provide:

$$q_f = Dc_f + v''_f; \tag{17}$$

wherein D is a diagonal matrix whose diagonal elements are the DFT of the sequence $$s_{zc}^{e}[n] \circledast g_0[n] \circledast g_{NMF,0}[n] \circledast s_{zc,MF}^{e}[n], \text{ for } 0 \le n \le L_q - 1,$$

and the subscript 'f' has been added to emphasize that $q_f$, $c_f$, and v"$_f$ are the frequency domain vectors obtained by taking the $L_q$-point DFT of the sequences q[n], c[n], and v"[n], respectively.

Further, since c[n] (i.e., in the time domain) is limited to a relatively short length of $L_c$, $$c_f = F_p c; \tag{18}$$

wherein c is a column vector of length $L_c$ containing the samples of the channel impulse response in the time domain, and $F_p$ the first $L_c$ columns of the DFT matrix of size $L_q$.

Substituting equation (18) into equation (17) provides:

$$q_f = DF_p c + v''_f. \tag{19}$$

Equation (19) is a linear equation in which signal vector $q_f$, coefficient matrix $DF_p$, and statistics of the noise vector $$v''_f$$

are known. This is an estimation theory problem from which an optimum estimate of c can be calculated as:

$$c = \left(F_p^H D^H \Phi_{vv}^{-1} DF_p\right)^{-1} F_p^H D^H \Phi_{vv}^{-1} q_f; \tag{20}$$

wherein $\Phi_{vv}$ is the covariance matrix of the noise vector $$v''_f.$$

The above procedure is provided as a non-limiting example method for estimating a channel impulse response, and, as will be appreciated by a person having ordinary skill in the art, other known methods that may be adopted for estimating a channel impulse response may be used.

As will be appreciated, automatic link establishment (ALE) may be used to establish a link between a number of nodes (e.g., two nodes) that wish to exchange information. For example, conventionally, a first node (e.g., Node A) that wishes to establish a communication with a second node (e.g., Node B) may identify a part of the spectrum that is free of interference and provides a sufficiently strong link between Node A and Node B. To this end, Node A senses a set of predetermined channels and those that are free may be selected to broadcast a signal that addresses Node B. This broadcast is repeated over all the available channels, one at a time. Each node in the network may examine the broadcasted signal to determine if the node is the intended recipient of the broadcasted signal. In this example, Node B may determine it is the intended recipient of the broadcasted signal, and node B may also examine the signals received from all the channels and recognize which channel has the strongest link. Node B may then relay this information back to Node A, informing Node A of the channel that provides the best link. Both nodes A and B then lock to this channel and start communicating. In conventional systems/standards, this process may need several tens of seconds to complete.

Various embodiments of the disclosure relate to a multi-band link establishment (MBLE) that is faster than conventional automatic link establishments. In some of these MBLE embodiments, each node may be allocated a set of subcarrier bands over which the node may send a link establishment signal to the other nodes in the network. This allocation may also act as an identity of each node (e.g., like its phone number). Moreover, each node may listen to the signals over subcarrier bands that have been assigned to other nodes that a node expects to receive a link establishment request from. Thus, if Node A wishes to start a communication with Node B, Node A may transmit a link request signal over the subcarrier bands that are assigned to itself (i.e., node A). Since Node B is listening to the subcarrier bands wherein transmission is occurring from node A, node B may detect (e.g., immediately) that node A is requesting to start a communication. In this example, all the nodes that expect a link establishment request from a particular node (e.g., node A) may be watching for a signal that may be coming from the particular node (i.e., node A). If a node expects link establishment requests from a number of nodes, the node may watch for the respective signals (e.g., a number of different signals). This clearly increases the complexity of the receiver proportional to the number of link establishment requests that it may be expecting.

In other MBLE embodiments, each node may be allocated a set of subcarrier bands over which other nodes may send their signals to the node. Moreover, each node may listen to the signals over subcarrier bands that have been assigned to the node. Thus, if Node A wishes to start a communication with Node B, node A may transmit a link request signal to Node B over the subcarrier bands that are assigned to Node B. Since Node B is listening to the subcarrier bands wherein transmission is occurring, node B may detect (e.g., immediately) that another node is requesting to start a communication. In this example, a node (e.g., node A) may only listen to its assigned subcarrier bands, hence, this example may have lower complexity when compared to method described above. However, this example may be prone to collisions when multiple nodes send link establishment requests simultaneously.

In various embodiments, the content of the signal that Node A sends to Node B may also reveal the identity that Node A is addressing Node B (and not the other nodes). The communication between the nodes A and B can then start (e.g., immediately). As will be appreciated by those of skill in the art, in these embodiments, channel sounding/scanning may not be necessary. Hence, this process may occur in a fraction of one second. Therefore, compared to conventional ALE methods, these MBLE embodiments may reduce the link establishment time by one (or, possibly, two) orders of magnitude. This may be helpful in emergency cases where it is advantageous to establish communications as fast as possible.

To further quantify the time that it takes to establish a link according to the embodiment disclosed above, an example is provided. In this example, a packet transmitted (from Node A) to establish a link may include a preamble containing three Zadoff-Chu sequences, each of length 16, and a payload of three bytes (24 bits) to pass any relevant information. Assuming the information bits are binary, these lengths add up to a total of $3\times16+24=72$ symbol intervals for transmitting a link request. Assuming a symbol rate of 500 symbols per second, a typical value for FBMC-SS, this corresponds to MBLE setup time $72/500=0.144$ seconds plus any processing/post-processing required to setup the link.

According to various embodiments, once a node (e.g., Node B) has received a request (e.g., from Node A) to establish a link, one of a variety of communication methods may be adopted (e.g. depending on network requirements). A few variations of these methods are discussed below.

As one example, a legacy compatible MBLE may be used to establish a link, followed by data communications using a common HF waveform. In MIL-STD-188-110D, there are 14 different waveforms with bandwidths in the range of 3 kHz to 48 kHz that can support data rates of 75 bits/s to 240 kbits/s. The modulation types range from simple BPSK to 256 QAM constellations. There is also a waveform that uses multiple Walsh codes to carry information. All of these Legacy HF waveforms are transmitted on a contiguous frequency band, and could be used for regular data communications after the initial link establishment, through MBLE.

While any of the above MIL-STD-188-110D waveforms may be used for data transmission, various embodiments related to MBLE may be used for the purpose of link establishment. For example, each node in a network may be assigned a set of subcarrier bands to which the request for link setup is transmitted to address that specific node. The receiving node may examine the SNR at all active subcarriers and decide which part of the spectrum may provide the best link. The receiving node may then relay this information to the link requesting node and depending on the channel quality, the two nodes may begin communication by choosing one of the MIL-STD-188-110D waveforms.

It is noted that MBLE embodiments disclosed herein may replace any of the existing ALE methods in the current/legacy HF modems to significantly speed up the link setup without affecting the rest of the system.

As another example, FBMC-SS may be used for data communications. According to various embodiments, after link establishment, connected nodes may communicate using FBMC-SS for data modulation. Setting up an FBMC-SS channel may be performed via one of a number of methods. For example, communicating nodes may choose to adopt an FBMC-SS with contiguous subcarrier bands over a part of the spectrum that results in a strong link. Alternatively, for example, the communicating nodes may choose to adopt an FBMC-SS with non-contiguous subcarrier bands over a much wider bandwidth. This can be the same spectrum through which the MBLE was performed or any other part(s) of the spectrum (e.g., over those portions of the spectrum that the link is found to be a stronger one). Further, other alternative methods of setting up an FBMC-SS channel known to persons of ordinary skill are within the scope of this disclosure.

As another example, broadcasting MBLE may be used to establish multiple simultaneous links. The various MBLE embodiments disclosed herein provide for effective broadcasting of the same information from a single transmitting node to multiple receiving nodes. In one example of setting up an effective broadcasting channel, a broadcasting node may transmit relevant information that reveals the communication channel that will be broadcasted over and the modulation method that will be used to all the individual nodes that should decode the broadcasted information. The relevant information may be sent as part of the payload of the link establishment request to all individual users that are being addressed by the requesting node, through the set of subcarrier bands that are assigned to the requesting node and is known (a priori) to all the nodes and they are listening to such request. The receiving nodes may then switch to the mode that will make them the receivers of the broadcasted information.

Further, an example of assigning subcarrier bands to different nodes will now be described. In this example, a total bandwidth of 1 MHz is divided into 100 spectrum segments, each of a bandwidth of 10 kHz. Within each spectrum segment, 20 subcarrier bands may be inserted, each having the bandwidth of 1 kHz, with center frequencies that are spaced by 0.5 kHz. The number of subcarrier bands assigned to each user is 100, with one subcarrier band selected from each of the spectrum segments.

Figure 12:
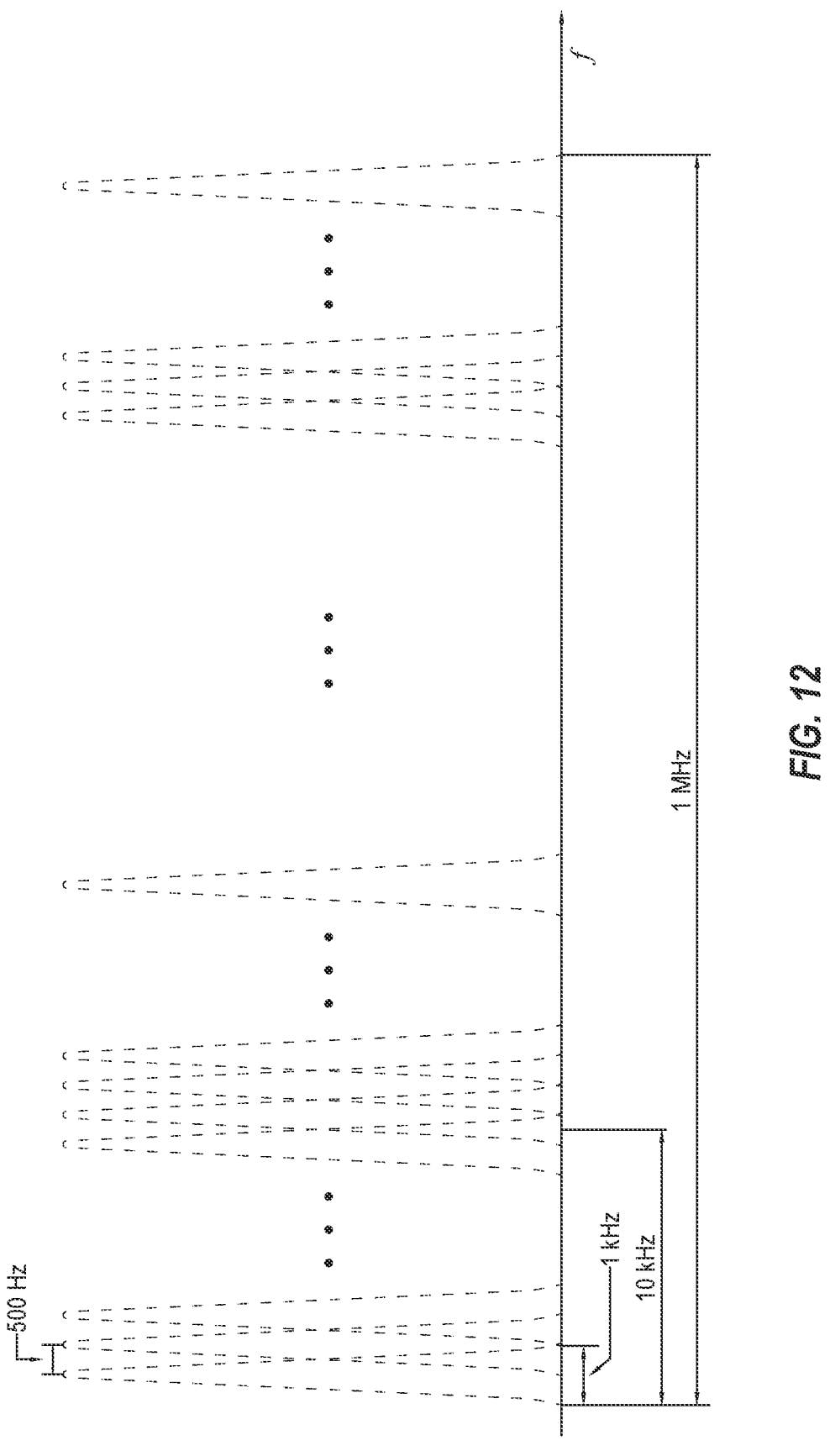
FIG. 12 depicts an example set of signal power spectral density, according to various embodiments of the disclosure.
Figure 13:
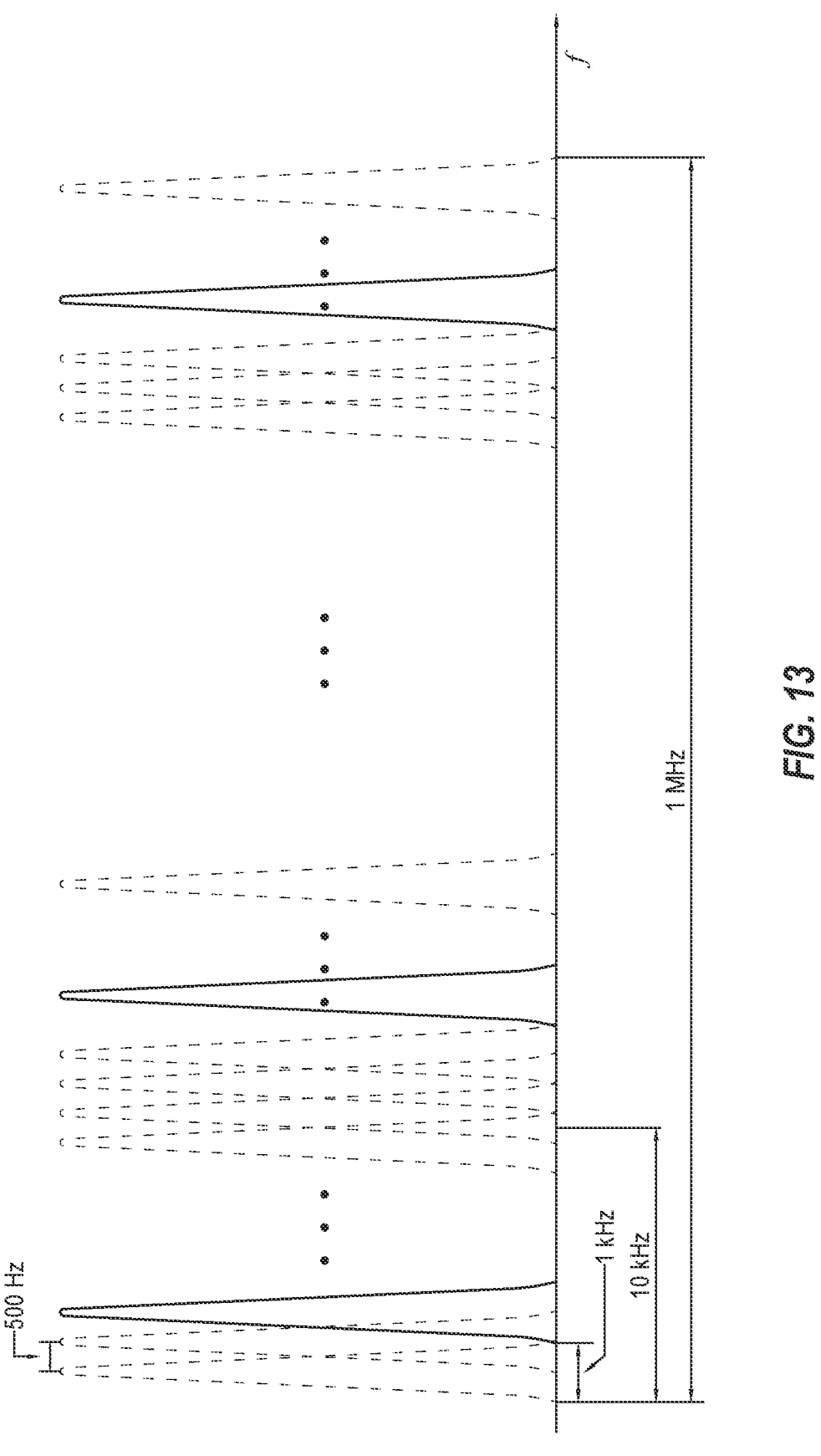
FIG. 13 depicts signal power spectral density for subcarrier bands for a node in a network, in accordance with various embodiments of the disclosure.

FIG. 12 depicts an example set of signal power spectral density, according to various embodiments of the disclosure. More specifically, FIG. 12 depicts the set of signal power spectral density that may appear at each of 2000 subcarrier bands. Further, FIG. 13 depicts signal power spectral density for subcarrier bands for a particular node in a network.

When subcarrier bands are allocated to different nodes within a network, the number of subcarrier bands that overlap among any pair of nodes/users may be minimized (e.g., to minimize interference among the members of the network if they happen to transmit signals simultaneously). When the number of nodes is less than a certain value, such an overlap/interference may be avoided (e.g., entirely) via a specific allocation of subcarrier bands. For instance, for the example of FIGS. 12 and 13, it may be possible to have completely non-overlapping subcarrier bands when the number of users is less than 10. This is because in each segment of 10 kHz of spectrum, there are 10 subcarrier bands that are non-overlapping, and, thus, each can be allocated to one of the 10 users. If the number of users is between 10 and 20, the selections can be made such that some pairs of users may suffer from a small amount of partial band interference, but there may not be any full subcarrier-band interference among any pair of nodes. For more than 20 users in a network, some users may encounter full-band interference only for a small fraction of subcarrier bands, even with a random allocation of the subcarrier bands to each user. To quantify this, a network of 1000 nodes/users was simulated with subcarrier bands allocated randomly according to the parameters of FIG. 12.

Figure 14:
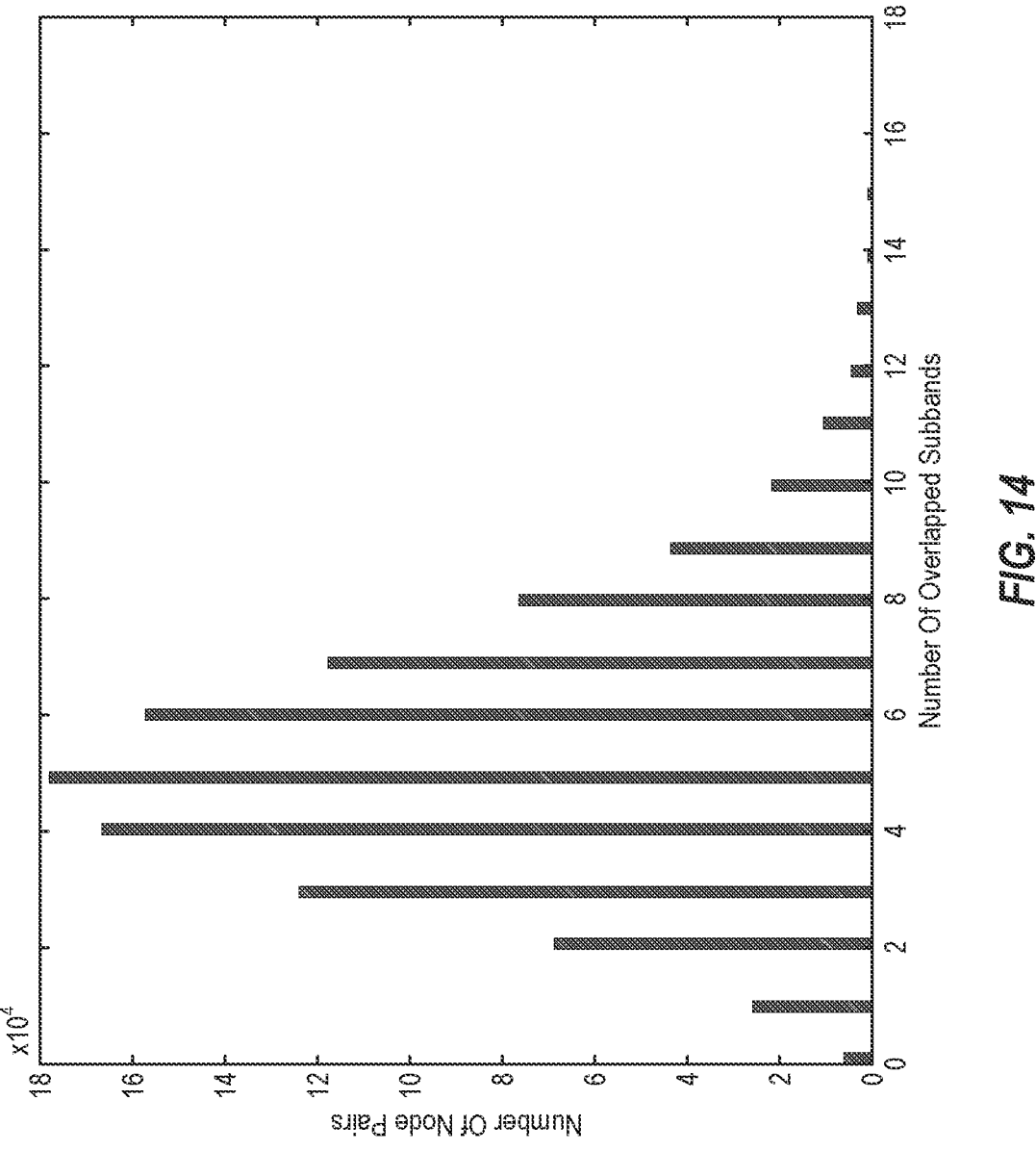
FIG. 14 is a histogram of a number of overlapped subcarrier bands in a network, in accordance with various embodiments of the disclosure.

The number of subcarrier bands common between all pairs of nodes/user terminals within this network was then determined. As shown in FIG. 14, which is a histogram of a number of overlapped subcarrier bands in a network, not more than 10 out of 100 subcarrier bands overlap. Furthermore, noting that the spreading gains for different nodes are uncorrelated, this amount of overlap may keep the interference among any pair of the nodes in the network minimal. Accordingly, the MBLE embodiments described herein may allow for operation of a network of thousands of nodes with a minimum interference among the nodes.

As disclosed herein, in HF communications it may be advantageous to spread subcarrier bands of an FBMC-SS signal over a relatively broad bandwidth in a non-contiguous manner. This may provide a great level of frequency diversity and, hence, establishing a reliable link, possibly without a need to identify specific bands (e.g., high quality bands) within the HF spectrum. Further, as noted herein, MBLE has the capacity to serve a network of a large number of HF transceiver nodes, and links may be established in a relatively short period of time that may be an order of magnitude faster than the existing ALE methods according to MIL-STD-188. Further, as disclosed herein, a packet design, according to various embodiments, may provide reliable detection of packets that may arrive at negative SNR (as low as −20 dB) as well as estimation of the channel state information.

Figure 15:
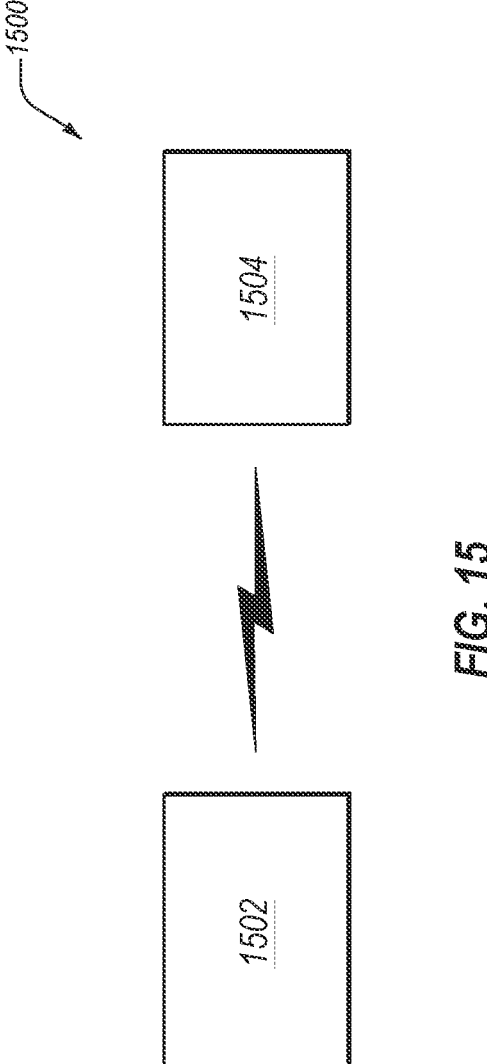
FIG. 15 depicts a communication system including a number of communication devices, according to various embodiments of the disclosure.

FIG. 15 is a block diagram of a communication system 1500 including a communication device 1502 and a communication device 1504. For example, each of communication device 1502 and a communication device 1504 may include a transmitter, a receiver, or both (e.g., a transceiver) configured to carry out one or more of the embodiments described herein. For example, communication system 1500 may be referred to as a "network" and/or each of communication device 1502 and communication device 1504 may be referred to as a "node."

For example, communication device 1502 and/or communication device 1504 may be configured to establish a link (i.e., with another communication device) via a multi-band link establishment (MBLE) process, as described above. Further, communication device 1502 and/or communication device 1504 may be configured to construct and transmit an FBMC-SS signal according to various embodiments disclosed herein. Moreover, communication device 1502 and/or communication device 1504 may be configured to process a received signal according to various embodiments disclosed herein. It should be further noted that the network presentation in FIG. 15, including two nodes, is an example network. An actual network may include more than two nodes.

Figure 16:
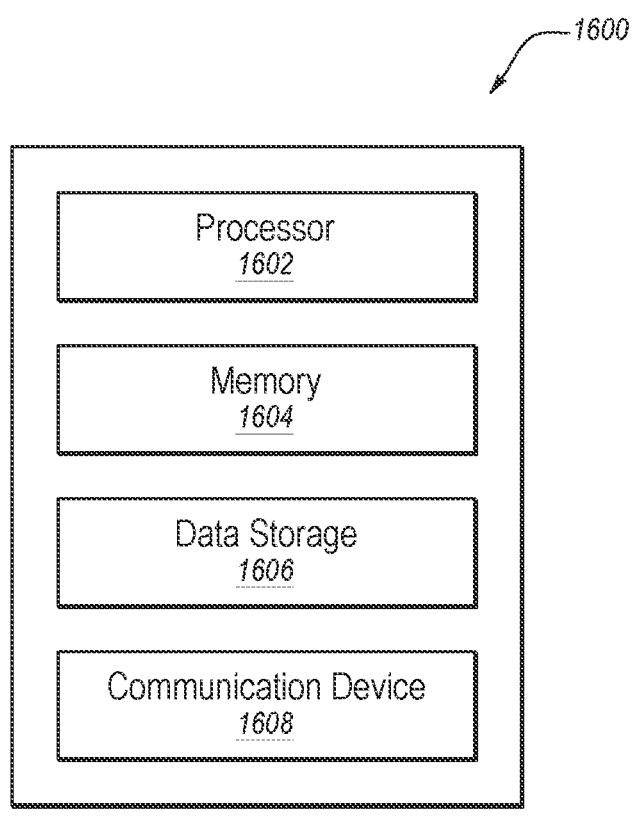
FIG. 16 illustrates an example system that may be configured to operate according to one or more embodiments of the disclosure.

FIG. 16 is a block diagram of an example system 1600, which may be configured according to at least one embodiment described in the present disclosure. As illustrated in FIG. 16, system 1600 may include a processor 1602, a memory 1604, a data storage 1606, and a communication unit 1608. One or more of communication device 1502 and communication device 1504 of FIG. 15, or parts thereof, may be or include an instance of system 1600.

Generally, processor 1602 may include any suitable special-purpose or general-purpose computer, computing entity, or processing device including various computer hardware or software modules and may be configured to execute instructions stored on any applicable computer-readable storage media. For example, processor 1602 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 16, it is understood that processor 1602 may include any number of processors. In some embodiments, processor 1602 may interpret and/or execute program instructions and/or process data stored in memory 1604, data storage 1606, or memory 1604 and data storage 1606. In some embodiments, processor 1602 may fetch program instructions from data storage 1606 and load the program instructions in memory 1604. After the program instructions are loaded into memory 1604, processor 1602 may execute the program instructions, such as instructions to perform one or more operations described in the present disclosure.

Memory 1604 and data storage 1606 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 1602. By way of example, and not limitation, such computer-readable storage media may include non-transitory computer-readable storage media including Random Access Memory (RAM), Read-Only Memory (ROM), Electrically Erasable Programmable Read-Only Memory (EEPROM), magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Computer-executable instructions may include, for example, instructions and data configured to cause processor 1602 to perform a certain operation or group of operations e.g., related to embodiments disclosed herein.

Communication unit 1608 may be configured to provide for communications with other devices (e.g., a communication device). For example, communication unit 1608 may be configured to transmit to and receive signals according to various embodiments disclosed herein. Communication unit 1608 may include suitable components for communications including, as non-limiting examples, a radio, one or more antennas, one or more encoders and decoders, and/or a power supply.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various detector types and configurations.

What is claimed is:

1. A communication system, comprising:
a network including a number of communication nodes including at least:
a first communication node including a dedicated first number of subcarrier bands; and
a second communication node including a dedicated second number of subcarrier bands;
wherein the first communication node is configured to transmit link requests to other nodes of the network over the dedicated first number of subcarrier bands, and the second communication node is configured to transmit link requests to other nodes of the network over the dedicated second number of subcarrier bands.

2. The communication system of claim 1, wherein the first communication node is configured to monitor the dedicated second number of subcarrier bands for link requests transmitted from the second communication node, and the second communication node is configured to monitor the dedicated first number of subcarrier bands for link requests transmitted from the first communication node.

3. The communication system of claim 1, wherein, in response to establishing a link via multi-band link establishment (MBLE), the first communication node and the second communication node are configured to communicate via a legacy compatible waveform, or filter bank multi-carrier spread spectrum (FBMC-SS).

4. A communication system, comprising:
a number of communication nodes, each communication node of the number of communication nodes including a number of dedicated subcarrier bands that other communication nodes of the number of communications nodes use to send link requests to the communication node.

5. The communication system of claim 4, wherein a communication node of the number of communication nodes is configured to listen for link requests on its dedicated subcarrier bands.

6. The communication system of claim 4, wherein at least one node of the number of communication nodes includes
a transceiver configured to transmit a filter bank multi-carrier spread spectrum (FBMC-SS) signal, the transceiver including a pulse-shaping filter including a number of non-contiguous subcarrier bands.

7. The communication system of claim 6, wherein spacing between center frequencies of the number of non-contiguous subcarrier bands is arbitrary.

8. The communication system of claim 6, wherein the transceiver includes a receiver comprising a matched filter configured to normalize energy of a signal at each of the number of non-contiguous subcarrier bands to a fixed value prior to adding signals of the number of non-contiguous subcarrier bands.

9. The communication system of claim 6, wherein a packet of the FBMC-SS signal includes a preamble including a number of periods of a symbol sequence.

10. A method, comprising:
transmitting, via a first communication device, a link request to a second communication device over a number of subcarrier bands assigned to the first communication device; and
monitoring, via the first communication device, a different number of subcarrier bands assigned to a second communication device for another link request transmitted to the first communication device.

11. The method of claim 10, further comprising receiving, at the first communication device and via the number of subcarrier bands, a response to the link request.

12. The method of claim 10, further comprising generating, via the first communication device or the second communication device, a filter bank multi-carrier spread spectrum (FBMC-SS) signal via a pulse-shaping filter including a number of non-contiguous subcarrier bands.

13. The method of claim 10, further comprising:
generating, via the first communication device, a filter bank multi-carrier spread spectrum (FBMC-SS) signal via a pulse-shaping filter including a number of non-contiguous subcarrier bands; and
transmitting the FBMC-SS signal.

14. The method of claim 13, further comprising normalizing energy of a number of signals associated with the number of non-contiguous subcarrier bands to a fixed value prior to adding the number of signals at a receiver side.

15. The method of claim 13, wherein transmitting the FBMC-SS signal comprises transmitting the FBMC-SS signal having a preamble including a number of periods of a symbol sequence.

16. The method of claim 15, further comprising:
receiving the FBMC-SS signal; and
filtering the FBMC-SS signal via a normalized matched filter including a matched version of the symbol sequence.

17. A method, comprising:
transmitting, via a first communication device, a link request to a second communication device over a first number of subcarrier bands assigned to the first communication device; and monitoring, via the first communication device, the first number of subcarrier bands, a link response transmitted from the second communication device.

18. The method of claim 17, further comprising receiving, via the second communication device, the link request sent via the first number of subcarrier bands.

19. A communication system, comprising:

a network including a number of communication nodes including at least:

a first communication node including a dedicated first number of subcarrier bands; and a second communication node including a dedicated second number of subcarrier bands;

wherein the first communication node is configured to receive link requests from other communication nodes of the network via the dedicated first number of subcarrier bands, and the second communication node is configured to receive link requests from other communication nodes of the network via the dedicated second number of subcarrier bands.

20. The communication system of claim 19, wherein the first communication node is configured to monitor its dedicated first number of subcarrier bands for link requests and/or link responses sent to the first communication node, and the second communication node is configured to monitor its dedicated second number of subcarrier bands for link requests and/or link responses sent to the second communication node.

* * * * *